Nov. 2, 1943.    H. G. SCHAEVITZ    2,333,588
MOLDING APPARATUS
Filed Dec. 13, 1940
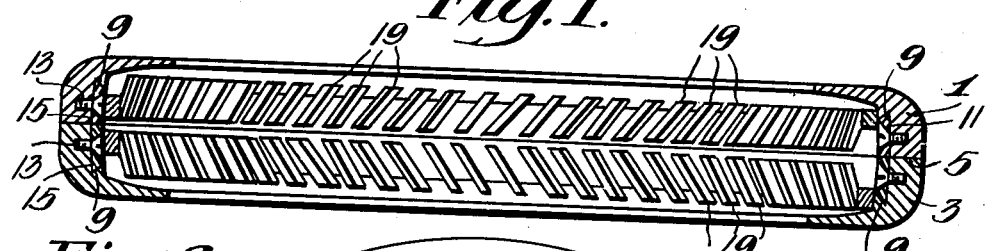
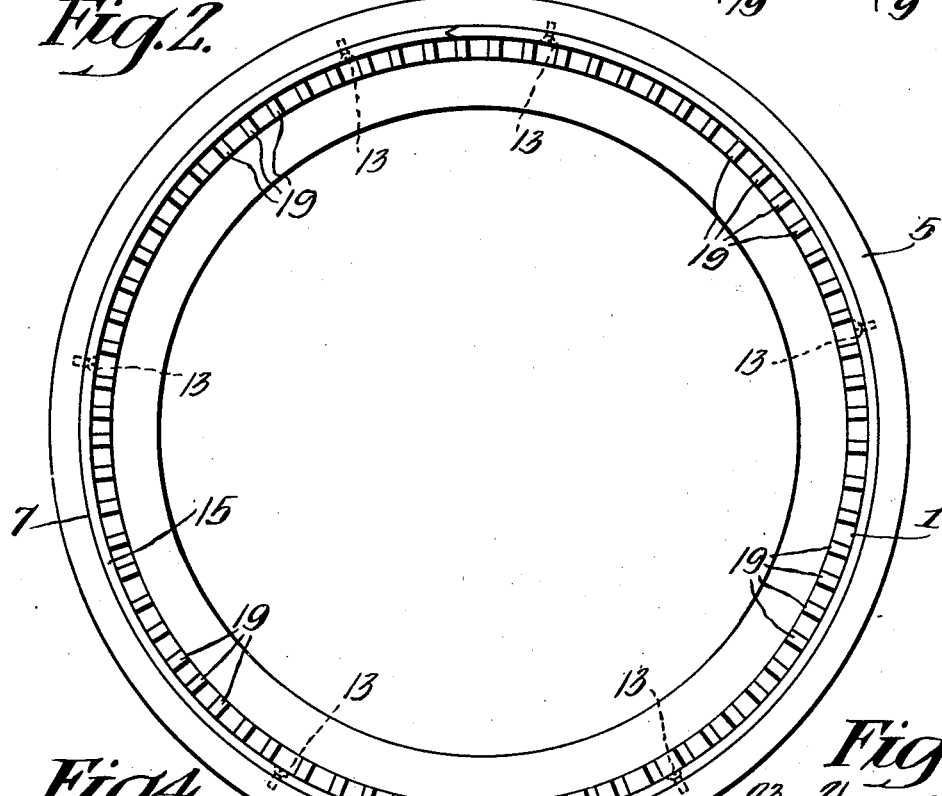
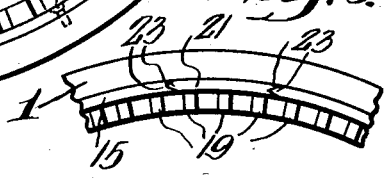
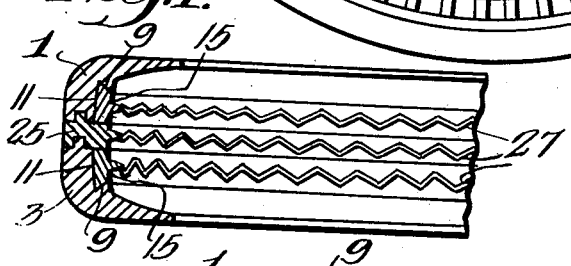
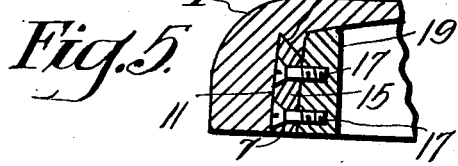
Inventor
Harry G. Schaevitz
Attorney Patented Nov. 2, 1943

2,333,588

UNITED STATES PATENT OFFICE 2,333,588

MOLDING APPARATUS

Harry G. Schaevitz, Camden, N. J.

Application December 13, 1940, Serial No. 369,914

3 Claims. (Cl. 18—18)

This invention relates to molding apparatus, and more particularly to matrices used in molding, recapping or retreading rubber tires.

In recent years, the practice of retreading or recapping worn rubber tires to provide new treads therefor has become quite extensive. The molds or matrices used in this art have usually been cast in two halves, each constituting a single, integral unit which requires machining and, in some cases, suitable engraving to provide a non-skid or ornamental surface design. Since tire sizes vary greatly and tread designs change from time to time, it is apparent that one engaged in the tire molding or tire recapping business is subjected to considerable expense in stocking and replacing necessary tire matrices. To overcome this difficulty, it has heretofore been proposed to replace the single, cast matrices with matrix shells to which surface inserts of desired configuration are applied, and while this type of matrix offers some advantages, it still does not satisfactorily solve the problem chiefly for the reasons that too much time is required in replacing the inserts, the cost involved is still relatively high, and considerable storage space is still required.

The primary object of my invention is to provide an improved tire molding matrix which is free from the aforementioned disadvantages.

More particularly, it is an object of my invention to provide an improved tire molding matrix suitable especially for recapping and retreading worn tires and which is very inexpensive in cost.

Another object of my invention is to provide an improved tire molding matrix of the insert type which can be readily assembled in but a few minutes even by one not skilled in the art.

Still another object of my invention is to provide an improved tire molding matrix as set forth above which readily lends itself to rapid molding of large quantities of tires.

A further object of my invention is to provide an improved tire molding matrix of the type set forth which can readily be accommodated to tires of different sizes.

Still another object of my invention is to provide an improved tire molding matrix as aforesaid which is simple in construction, is highly efficient in use, and which very greatly reduces both initial expense required for installation of a molding plant and the storage space customarily required with conventional matrices to afford a wide variety of tire sizes and tread designs.

In accordance with my invention, I provide a pair of cooperative, annular matrix shells each of which is provided with a recess extending circumferentially around the shell, the recesses also extending from the mating surfaces of the shells a distance short of the thickness thereof. In each of the recesses is placed a resilient metal band having a plurality of design elements or ornaments in relief thereon, the bands being tightly fitted in the recesses to conform snugly to the curvature thereof and being removably secured to their respective shells by a few screws. With this construction, any shell may be used with any band having design elements of any desired configuration affixed thereto, and it is only a matter of a few minutes to remove the screws which hold the design-bearing bands on the shells, replace the bands and secure the new bands in place by the screws. For tires of larger diameters, correspondingly larger shells are, of course, required, but the same bands may be used with an appropriate insert, also of resilient metal and also provided with the same ornamental design elements, inserted between the ends of the bands. Thus, by making the shells and bands more or less interchangeable, the number of parts required to be stocked is greatly reduced, as are also the initial and subsequent investments.

The novel features that I consider characteristic of my invention are set forth with particularity in the appended claims. The invention itself, however, both as to its organization and method of operation, together with additional objects and advantages thereof, will best be understood from the following description of several embodiments thereof, when read in connection with the accompanying drawing, in which Figure 1 is a central, transverse sectional view of a pair of cooperating matrices formed according to the present invention, Figure 2 is an elevational view looking into one of the matrices shown in Figure 1, Figure 3 is a fragmentary view similar to Figure 2 showing the application of the resilient band to a matrix of larger diameter, Figure 4 is a fragmentary view similar to Figure 1 but showing a modified form of band and showing, also, the application of this invention to matrices for molding tires of wider treads, and Figure 5 is an enlarged, fragmentary, sectional view of a portion of one of the matrices of Figure 1.

Referring more particularly to the drawing, wherein similar reference characters designate corresponding parts throughout, there is shown, in Figure 1, a pair of annular matrix shells 1 and 3 having contacting or mating surfaces 5 which preferably lie in a plane normal to the axis of the shells. Each of the shells 1 and 3 is provided with an annular or circumferential recess 7 extending transversely across the shell from the surface 5 a distance short of the thickness of the shell and terminating in an angular shoulder 9 which extends toward the surface 5 as it recedes from the base 11 of the recess 7, so that the shoulder 9 overlaps the base 11.

Secured tightly to the base 11 of each of the recesses 7 by means of several circumferentially spaced screws 13 is a resilient metal band 15 the inner edge of which is angularly formed to fit snugly under the shoulder 9, thereby insuring an accurate fit against the base 11. When applying the bands 15, they are slipped under the shoulders 9 after which the screws 13 are tightened down to cause the bands to assume the curvature of the recesses 7, in each case. The bands 15 may be made of cast aluminum, for example, or of sheet steel or any other desired metal, so long as they are resilient, and can be made to conform to the curvature of the recess 7 in each shell.

Removably secured to the bands 15, as by screws 17, are a plurality of circumferentially spaced ornamental blocks or the like 19 which constitute projections that form corresponding indentations in the surface of the tire during the molding operation to thereby provide a non-skid or ornamental tread therefor. The blocks 19 may be of any desired configuration and are so mounted on the bands 15 that they preferably overlap the shoulders 9 somewhat when the bands 15 are applied in place. The blocks or other design elements 19 are secured to the bands 15 in advance of the latter's being applied to the matrix shells 1 and 3. A series of such bands may, of course, be prepared in advance and kept in stock, and when a desired tire tread is to be molded, the appropriate band can be applied to the shell by the screws 13 in but a few minutes. It is obvious, therefore, that a single shell can serve as the supporting structure for an infinite number of bands with an infinite variety of design elements 19 thereon. Should a tread design become obsolete and a new one come into vogue, the blocks or design elements 19 can easily be removed from the supporting band 15 and a new set of design elements applied thereto by means of the screws 17.

In molding tires of larger diameter, the same bands 15 may be applied to shells of larger diameter, in which case, there will be a space left between the ends of the bands. This space may be filled by a resilient insert 21, as shown in Figure 3, the insert 21 being preferably of the same material as the band 15 and having design elements 19 thereon which match the blocks 19 of the band 15. Thus, it is not necessary to provide the bands 15 in a number of sizes, as one or more inserts 21 may be employed to fill in the space between the ends of the band, the band ends and the ends of the insert or inserts 21, as the case may be, being provided with male and female mating portions 23, as clearly shown in Fig. 3.

When it is desired to mold or recap a tire of a wider tread, a spacer ring 25 may be employed between the shells 1 and 3, as clearly shown in Figure 4. In this modification of my invention, the bands 15 are provided with integrally cast ribs 27, as is also the spacing ring 25, the ribs 27 forming corresponding depressions in the tire tread. Here, again, therefore, by suitably mating the ring 25 with the shells 1 and 3 and matching the design elements of the ring 25 with the design elements on the bands 15, it is obvious that a large quantity of matrix shells need not be stocked.

From the foregoing description, it will be apparent to those skilled in the art that I have provided an improved tire molding matrix which has many advantages over prior art matrices. Not only can tread accuracy be obtained easily with my improved matrix, but the simplicity of its design and the large variety of tire sizes to which it can be applied makes the use thereof extremely economical. Although I have shown and described several embodiments of my invention, it will be apparent to those skilled in the art that many other forms thereof, as well as changes in those described, are possible. Accordingly, I do not wish to be limited except insofar as is made necessary by the prior art and by the spirit of the appended claims.

I claim as my invention:

1. In tire molding apparatus, a pair of complemental, annular matrix shells for molding a tire of predetermined size, said shells each having an annular recess therein adjacent the mating surfaces thereof, a resilient band in each of said recesses removably secured to its associated shell and tightly fitted against the recess thereof to conform to the curvature of the recess, said bands being shorter than the circumferences of said recesses whereby they are normally adapted to mold tires of a size smaller than said predetermined size, a pair of resilient inserts filling in the spaces between the ends of said bands and cooperating with said bands to adapt said apparatus to mold tires of said predetermined size, said inserts being also fitted tightly against their associated recesses to conform to the curvature thereof, and a plurality of design elements removably secured to said bands and to said inserts for forming a design in said tire.

2. In tire molding apparatus, a pair of complemental, annular shells each having a plane surface normal to its axis and provided with an annular recess extending away from said surface, a pair of resilient, split bands fitted tightly one in each of said recesses, means removably securing said bands to their respective shells, and a plurality of design elements on each of said bands.

3. In tire molding apparatus, a pair of complemental, annular shells each having a plane surface normal to its axis and provided with an annular recess extending away from said surface a distance short of the thickness of the shell, a pair of resilient, split bands fitted tightly one in each of said recesses, means removably securing said bands to their respective shells, each of said bands being of the same width as its associated recess, and a plurality of design elements removably secured to each of said bands.

HARRY G. SCHAEVITZ.